Patented Aug. 21, 1951

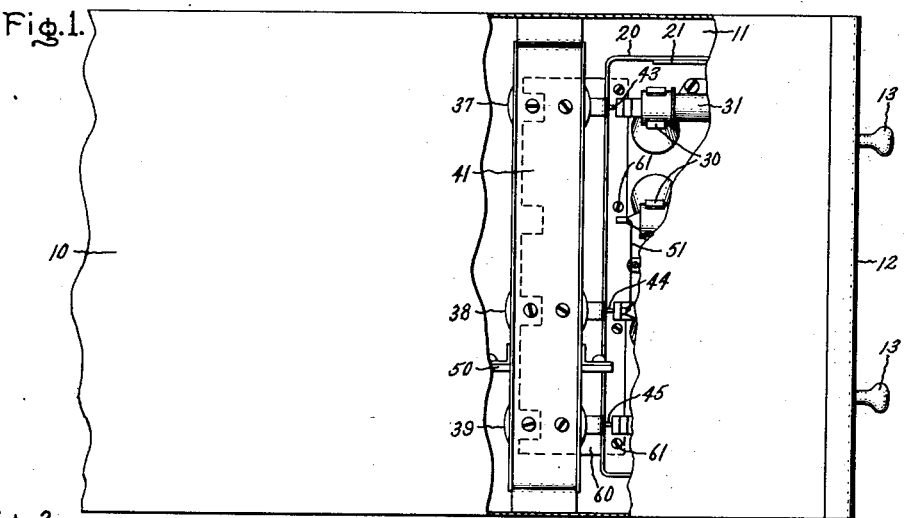

2,565,314

UNITED STATES PATENT OFFICE 2,565,314

ROTATABLE DIHEDRAL PROTECTIVE ENCLOSURE FOR HIGH-VOLTAGE APPARATUS

Franklin W. Lewis, Clifton Heights, Pa., assignor to General Electric Company, a corporation of New York Application July 19, 1949, Serial No. 105,482

5 Claims. (Cl. 175—298)

1

The invention relates to grounded safety enclosures for high voltage apparatus and particularly potential transformers having removably mounted fuses, and the principal object is to provide a grounded safety metal enclosure wherein the apparatus is removably mounted within and provided with a disconnecting contact terminal located within a right dihedral angle formed by a hinged door and an inner mounting panel carried thereby for insertion of the apparatus into a connected portion inside the enclosure and removal therefrom for inspection or maintenance and replacement of the fuses.

Other objects are to provide coordinate angular mounting arrangement of transformer primary and secondary disconnecting devices as well as primary grounding connections inside the enclosure that can be operated automatically by rotating the right angularly related panel inside and outside the enclosure upon operation of door between the closed and open positions as well as to provide an improved cooperating notched insulating barrier extension on the panel that will effectively mask the dangerous high voltage parts when the door is open while maintaining simplicity of construction and hence low manufacturing cost.

Other objects and advantages of the invention will appear in the following description of the accompanying drawing in which Fig. 1 is a side view of the safety enclosure for high voltage apparatus with one of the side walls partly broken away to show the cooperating relation of the isolated high voltage parts when the door is closed. Fig. 2 is a top view with the top of the compartment removed more clearly to reveal the cooperating relations of the interconnected high voltage parts. Fig. 3 is a front view of the compartment with the door open and the high voltage apparatus disconnected and removed from the enclosure to be accessible for maintenance, and Fig. 4 is a top view with the top of the compartment removed to show the well insulated relationship of the disconnected parts while the door is open.

As shown in Fig. 1, the metal enclosure 10 may be part of a suitably grounded metal-clad switchgear installation that is provided with a high voltage isolating compartment 11 having a vertically hinged access door 12 provided with a pair of locking handles 13. As more clearly shown in Fig. 2, the door 12 is supported on suitable hinges 14 carried by the side wall 15 and each handle 13 is provided with a rotatable latch

2

16 that engages inside the turned-over edge 17 of the opposite side wall 18.

The door 12 carries a right angularly disposed inner panel 20 in the form of a metal plate narrower than the door and with the edges turned over for stiffening reinforcement and for welded engagement with the bracing angles 21 that may be suitably secured by welding to the stiffening angles 22 that extend across the inside of door 12 adjacent the top and bottom edges thereof. Thus, the vertically hinged door 12 and narrower panel 20 form a right dihedral angle therebetween and are readily joined together into a rigid structure by welding so that the panel 20 extends normal to the inside of the door 12 adjacent the vertical hinged edge thereof in parallel spaced-apart relation with the side wall 15 of the grounded metal compartment 11 as shown in Fig. 2.

As shown in both Figs. 2 and 3, the protected high voltage apparatus comprises a pair of high voltage potential transformers 25 and 26 that are mounted in vertical alignment on the panel 20 back of the door 12 and within the right dihedral angle therebetween by means of suitable brackets 27 which receive the mounting screws 28. Each transformer is provided with integral high voltage bushings 29 for individually supporting the fuse clips 30 within which the transformer primary protective fuses 31 are removably mounted. The fuse clips 30 on the innermost top, bottom and one of the intermediate bushings 29 are provided with the three disconnecting contact terminals 33, 34 and 35 respectively and these contact terminals are aligned within the dihedral angle formed by the door and the panel farther from the hinged edge of door 12 than the inner edge of panel 20 and thus project somewhat beyond the line between the inner edge of the panel 20 and the free edge of the door 12.

Three corresponding high voltage circuit terminal contacts 37, 38 and 39 are each separately carried by a suitable high voltage insulator 40 that is mounted upon a bracket 41 suitably secured to the opposite side wall 18 of the compartment 11 diagonally opposite the hinged edge of door 12 so that the yieldingly supported rectilinearly movable contact pins 43, 44 and 45 are biased into the path of the corresponding fuse terminal contacts 33, 34, 35 for circuit closing engagement therewith when the door 12 is closed. Each pin is mounted as indicated in Fig. 2 which shows the pin 43 slidably mounted in suitable holes formed in the spaced-apart upturned ends of the two-part high voltage contact terminal 37 with the spring 46 interposed between one upturned terminal end and the shoulder 47 on the pin so as to insure firm circuit-closing engagement of the pin 43 with the fuse terminal contact 33. A suitable insulating barrier 50 may be mounted on the channel bracket 41 centrally between the more closely adjacent high voltage circuit contact terminals 38 and 39 to prevent flashovers therebetween in case of voltage surges or the like.

The circuit voltage impressed upon fuse terminal 34 is communicated to the adjacent fuse clip 30 of transformer 25 by means of the fixed conductor 51. Thus when the fuse terminal contacts 43, 44 and 45 are in circuit-closing engagement with the high voltage circuit terminals 37, 38 and 39 respectively, as indicated in Figs. 1 and 2, the primary windings of the transformers 25 and 26 are connected in open delta with a protective fuse 31 in circuit at each end of each primary winding.

Transformer secondary disconnecting switching means are provided in the form of both a multiple contact terminal block 55 that is fixedly mounted on the compartment wall 15 back of panel 20 so as to be located adjacent the inner vertical edge of the panel 20 when the door 12 is closed as shown in Fig. 2, and a set of cooperating yieldingly mounted rectilinearly mounted circuit closing contact pins 56 that are carried on the panel 20, preferably in the space between the two transformers 25 and 26 for convenience in separately wiring the transformer secondary leads thereto. These separately insulated pins 57 extend through the panel 20 and are spring-biased similarly to the pins 43 for separate engagement with a corresponding contact terminal 58 of the block 55 when the door is in the closed position as shown in Fig. 2. In this way the low voltage secondary winding connections of the transformers 25 and 26 are brought out to the terminal block 55 for interconnection with the control or indicating circuits of the metal-clad switchgear equipment in any usual and well-known manner.

A special safety barrier 60 formed of insulating material is secured to the panel 20 by the mounting screws 61 and provided with a series of notches 62 aligned in the free edge thereof for straddling the primary grounding contacts 63, 64 and 65 that are shown mounted on the inturned edge of the opposite wall 18 adjacent the free vertical edge of door 12 so as to extend into the path of the fuse terminal contacts 33, 34, 35 for engagement therewith during the initial part of the opening movement of the door 12. These aligned notches 62 also insure sufficient mechanical clearance between the barrier 60 and the high voltage circuit terminal contact pins 43, 44, 45 during the opening and closing of the door since the grounding contacts 63, 64 and 65 are in planar alignment therewith. The engagement with the grounding contacts 63, 64 and 65 serves to effectively ground the high voltage parts of transformers 25 and 26 after their disconnection from the high voltage-circuits and before ready access can be had thereto by the complete opening of the door as shown in Fig. 4. The safety barrier 60 serves in conjunction with the narrow panel 20 to effectively mask the opening into the compartment 11 when the door 12 is open thereby preventing accidental contact with the high voltage parts inside the compartment. Thus, as indicated in Figs. 3 and 4, high voltage transformers 25 and 26 and their protective fuses 31 are readily accessible when the door 12 of the grounded compartment 11 is opened for inspection or replacement with very little, if any, danger to the operator or maintenance man.

What I claim as new and desire to secure by Letters Patent of the United States is:

1. In combination, a grounded metal compartment having a hinged metal door, a panel mounted on the inside of the door adjacent the hinged edge thereof to form a dihedral angle therebetween for rotation inside the compartment when the door is closed, electrical apparatus mounted on the panel within the dihedral angle and including a protective fuse removably mounted to be accessible within the angle when the door is open and provided with a terminal contact located within the dihedral angle and having a circular path outside the path of the panel, and a circuit terminal contact mounted inside the compartment diagonally opposite the hinged edge of the door to position the terminal contact out of the path of the panel and in the path of the fuse terminal contact for circuit closing engagement therewith when the door is closed.

2. In combination, a grounded metal compartment having a hinged metal door, a panel mounted on the inside of the door adjacent the hinged edge thereof to form a dihedral angle therebetween for rotation inside the compartment when the door is closed, high voltage apparatus mounted on the panel within the dihedral angle and including a protective fuse removably mounted to be accessible within the angle when the door is open and provided with a terminal contact located within the dihedral angle and having a circular path outside the path of the panel, a high voltage circuit terminal contact having an insulator mounted inside the compartment diagonally opposite the hinged edge of the door to position the circuit terminal contact out of the path of the panel and in the path of the fuse terminal contact for circuit-closing engagement therewith when the door is closed, and disconnecting means for the apparatus including a contact terminal mounted inside the compartment on the wall carrying the hinged edge of the door and adjacent the path of the panel and having a cooperating contact mounted on the panel for circuit closing engagement therewith when the door is closed.

3. In combination, a grounded metal compartment having a hinged metal door, a panel carried by the door and mounted adjacent the hinged edge normal to the inside of the door for rotation inside the compartment when the door is closed, high voltage apparatus mounted on the panel back of the door and including a protective fuse removably mounted to be accessible when the door is open and provided with a terminal contact disposed within the angle between the panel and the door and farther from the hinged edge of the door than the inner edge of the panel, a high voltage circuit terminal contact having an insulator mounted on the side wall of the compartment diagonally opposite the hinged edge of the door to position the circuit terminal contact out of the path of the panel and in the path of the fuse terminal contact for circuit-closing engagement therewith when the door is closed, and disconnecting means for the apparatus including a contact terminal mounted on the side wall of the compartment carrying the hinged edge of the door and adjacent the back of the panel and having a cooperating contact extending through the panel for circuit-closing engagement therewith when the door is closed.

4. In combination, a grounded metal compartment having a vertical edge hinged metal door, a metal panel of lesser width than the door carried by the door and mounted normal to the inside of the door adjacent the vertical hinged edge thereof for rotation inside the compartment when the door is closed, a high voltage transformer mounted on the panel back of the door and having a protective fuse removably mounted on the transformer to be accessible when the door is open and provided with a terminal contact disposed within the angle between the panel and the door and farther from the vertical hinged edge of the door than the inner vertical edge of the panel, a high voltage circuit terminal having an insulator mounted on the vertical side wall of the compartment diagonally opposite the hinges of the door to position the circuit terminal contact out of the path of the panel and in the path of the fuse terminal contact for circuit closing engagement therewith when the door is closed, transformer secondary disconnecting means including a fixed contact terminal mounted on the vertical side wall of the compartment carrying the hinges of the door and adjacent the back of the panel and a resiliently mounted contact extending from the transformer secondary through the panel for circuit-closing engagement with the fixed contact terminal when the door is closed, and an insulating barrier carried by and projecting from the inner vertical edge of the panel and provided with a notch for straddling the high voltage circuit terminal during the opening of the door to thereby substantially mask the high voltage terminal when the door is open.

5. In combination, a grounded metal compartment having a vertical edge hinged metal door, a metal panel of lesser width than the door carried by the door and mounted normal to the inside of the door adjacent the vertical hinged edge thereof, a high voltage transformer mounted on the panel back of the door and having a protective fuse removably mounted thereon to be accessible when the door is open and provided with a terminal contact disposed within the angle between the panel and the door and farther from the hinged edge of the door than the inner edge of the panel, a high voltage circuit terminal having an insulator mounted on the vertical side wall of the compartment diagonally opposite the hinged edge of the door to position the circuit terminal contact out of the path of the panel and in the path of the fuse terminal contact for circuit closing engagement therewith when the door is closed, transformer secondary disconnecting means including a fixed contact terminal mounted on the side wall of the compartment back of the panel and a resiliently mounted contact extending from the transformer secondary through the panel for circuit-closing engagement with the fixed contact when the door is closed, and an insulating barrier carried by and projecting from the inner vertical edge of the panel and provided with a notch for straddling the high voltage circuit terminal during the opening of the door to substantially mask the high voltage terminal when the door is open, and a grounding contact mounted on the side wall of the compartment adjacent the free vertical edge of the door in planar alignment with said high voltage contact to engage with said fuse terminal contact during the opening of the door and be straddled by said notch.

FRANKLIN W. LEWIS.

REFERENCES CITED

The following references are of record in the file of this patent:

UNITED STATES PATENTS

| Number | Name | Date |
| --- | --- | --- |
| 942,963 | Hamm & Legge | Dec. 4, 1909 |
| 1,211,752 | Pieper | Jan. 9, 1917 |
| 1,351,043 | Kries | Aug. 31, 1920 |
| 1,561,239 | Jennings | Nov. 10, 1925 |
| 1,594,010 | Gaspari | July 27, 1926 |
| 1,809,025 | Cruser | June 9, 1931 |
| 2,020,913 | Schramm | Nov. 12, 1935 |
| 2,441,643 | Mickler | May 18, 1948 |